United States Patent [19]

Steel

[11] 3,949,123
[45] Apr. 6, 1976

[54] COATED FABRIC HAVING SUEDE-LIKE SURFACE

[75] Inventor: Robert N. Steel, Newtown, Conn.

[73] Assignee: Uniroyal Inc., New York, N.Y.

[22] Filed: Dec. 8, 1972

[21] Appl. No.: 313,388

[52] U.S. Cl. ............... 428/95; 427/355; 427/359; 427/373; 428/96; 428/97; 428/310; 428/311; 428/315; 428/904
[51] Int. Cl.$^2$... B32B 3/00; B32B 33/00; B32B 5/18
[58] Field of Search .............. 117/11, 62, 63, 135.5, 117/140 A; 161/159; 427/355, 359, 373; 428/95, 96, 97, 310, 311, 315, 904

[56] References Cited
UNITED STATES PATENTS

| | | | |
|---|---|---|---|
| 2,570,182 | 10/1951 | Daly | 260/2.5 |
| 2,757,147 | 7/1956 | Pooley | 260/2.5 |
| 2,811,464 | 10/1957 | Stiehl et al. | 117/140 A |
| 2,837,440 | 6/1958 | Boivin | 117/11 |
| 2,901,774 | 9/1959 | Pooley | 260/2.5 X |
| 3,041,193 | 6/1962 | Hamway et al. | 117/140 A |
| 3,054,691 | 9/1962 | Myers et al. | 117/63 |
| 3,067,482 | 12/1962 | Hollowell | 117/63 |
| 3,067,483 | 12/1962 | Hollowell | 117/140 A |
| 3,100,721 | 8/1963 | Holden | 117/135.5 |
| 3,284,274 | 11/1966 | Hulslander et al. | 161/159 |
| 3,384,502 | 5/1968 | Japs | 117/140 A |
| 3,429,727 | 2/1969 | Hochberg | 117/140 A |
| 3,524,791 | 8/1970 | Bethman et al. | 117/11 |
| 3,578,544 | 5/1971 | Thorsrud | 428/904 X |
| 3,719,549 | 3/1973 | Mittman | 428/904 X |
| 3,772,059 | 11/1973 | Shikada | 117/63 |
| 3,776,753 | 12/1973 | Habib | 117/135.5 X |
| 3,776,790 | 12/1973 | Harrington et al. | 117/11 X |

*Primary Examiner*—Charles L. Bowers, Jr.
*Attorney, Agent, or Firm*—James J. Long

[57] ABSTRACT

Fabric is coated with a cellular blend of polyvinyl chloride resin and butadiene-acrylonitrile rubber, the said rubber component being vulcanized; the coating is buffed to expose the cells and thereby produce an artificial suede finish. The presence of the cured butadiene-acrylonitrile rubber in the composition eliminates the undesirable "glint" or shine that would otherwise be present, and gives a desirable flat finish. If an additional noncellular layer of the blend of polyvinyl chloride resin and butadiene-acrylonitrile rubber is interposed between the base fabric and the cellular surface layer, the abrasion resistance of the laminate is enhanced.

13 Claims, No Drawings

COATED FABRIC HAVING SUEDE-LIKE SURFACE

This invention relates to a coated fabric having a suede-like surface.

Considerable effort has been expended in the past to produce suede surfaced coated fabrics having appearances, feel, and hand similar to, and preferably identical with, suede surfaces developed on natural leather. Thus, U.S. Pat. No. 3,041,193, June 26, 1962, Hamway et al., discloses a method of making a suede-like coated fabric in which the sueded suface is a layer of cellular polyvinyl chloride. In the process a supporting fabric is coated with an expandable layer of plasticized polyvinyl chloride, preferably by casting a plastisol composition containing a blowing agent. After applying the plastisol as a coating to the surface of the supporting fabric the composite is exposed to time and temperature conditions sufficient to "fuse" the plastisol layer and decompose the blowing agent, thereby releasing a gas causing expansion of the polyvinyl chloride resin layer. Thereafter the surface of the cellular polyvinyl chloride layer, after cooling, is abraded through the use of high speed grinding wheels, grinding drums, or grinding belts in which the grinding surface is an abrasive material such as sandpaper or the like. The composition may include a polymeric plasticizer, such as a copolymer of a conjugated diolefin (such as butadiene) with a copolymerizable monomer (such as acrylonitrile).

In U.S. Pat. No. 3,429,727, February 25, 1969, Hochberg, blends of polyurethane and vinyl chloride polymers and copolymers in solvent solution form are employed as coating compositions for fabrics; the coating composition is coagulated on the surface of the supporting fabric in the form of a cellular structure. Following removal of the solvent from the polymer layer the surface of the cellular layer is buffed in a Curtin-Hebert drum buffer which removes the very top layer of the cellular layer exposing the cells, such exposure giving the surface a suede-like appearance.

An additional U.S. patent describing suede surfaced coated fabrics developed from synthetic polymers is U.S. Pat. No. 3,524,791, Aug. 18, 1970, Bethman et al.

The present invention departs from previous practice by employing, as the fabric coating, a blend of vinyl chloride resin and butadiene-acrylonitrile rubber, the butadiene-acrylonitrile rubber component of the blend being cured prior to buffing the surface to produce the suede effect. It has surprisingly been found that the suede finish thus produced using the cellular vinyl chloride resin and cured butadiene-acrylonitrile rubber blend is free from undesirable "glint" or shine and has increased abrasion resistance. This result is particularly unexpected in view of the fact that conventional PVC (polyvinyl chloride) based suede coated fabrics display a displeasing shine or glint, i.e., light is reflected from the walls of the cells exposed at the surface of the cellular layer as a result of the abrading process. Such glint or shine is highly undesirable since natural leather suede does not exhibit such shine or glint. Glint can further be referred to as the sparkle noted on conventional artificial suede surfaces, such sparkle being the result of light shining off the cell walls of those cells which have been exposed at the surface of the product through the abrading or buffing step. It is believed that the two-phase system of cured nitrile rubber/PVC resin blend employed in the present invention is the means by which the present product is rendered devoid of undesirable glint.

Blends of vinyl chloride resin, butadiene-acrylonitrile rubber, and curative for the rubber, suitable for use as the fabric coating composition of the invention, are described in U.S. Pat. Nos. 2,570,182, Oct. 9, 1951, Daly et al., 2,757,147, July 31, 1956, Pooley, and 2,901,774, Sept. 1, 1959, Pooley. The vinyl chloride resin component of the blend may be vinyl chloride homopolymer itself, or a copolymer of a major proportion of vinyl chloride with one or more copolymerizable monomers such as vinyl acetate, diethyl maleate, diethyl fumarate, and vinylidene chloride (see, for example, U.S. Pat. No. 2,757,147, col. 3, line 71 to col. 4, line 2). The butadiene-acrylonitrile copolymer employed usually contains from 15 to 40% of combined acrylonitrile. For purposes of the present invention, the vinyl chloride resin and butadiene-acrylonitrile rubber are employed in ratio of from 20:80 to 80:20, by weight. Preferred compositions contain from 20 to 40 parts of the butadiene-acrylonitrile rubber and correspondingly from 80 to 60 parts of the vinyl resin, by weight. The coating composition includes a curative for the butadiene-acrylonitrile rubber, usually sulfur or a sulfur-yielding vulcanizing agent, in amount sufficient to cure or vulcanize the rubber. To reduce the time-temperature conditions required to bring about cure of the rubber a conventional organic accelerator of sulfur vulcanization is also included in the composition.

The coating composition further contains a conventional blowing agent, that is, a substance which upon heating causes a multitude of cells or bubbles to be formed in the surface layer. For this purpose such conventional blowing agents as azodicarbonamide, or others such as are referred to in U.S. Pat. No. 3,041,193, column 3, lines 45–52, may be used. The level of blowing agent frequently varies from 1 to 10 parts per 100 parts of polymers in the blend.

The coating composition may include any desired additional appropriate compounding ingredients. Ordinarily the composition includes one or more suitable stabilizers, and optionally may include one or more fillers such as hydrated alumina, calcium carbonate, etc., and/or various pigments and the like. One or more conventional plasticizers are usually included in amounts appropriate to impart the desired calendering properties and flexibility in the final product.

In preparing the blend, the mixing conditions are such as to cause fusion of the vinyl chloride resin and butadiene-acrylonitrile rubber components. For example, the two polymers are mixed on a mill at a temperature of 300°–400°F. until the ingredients are well fused. Before adding the blowing agent and curing agent for the rubber phase, the temperature of the mix and the mill is lowered, for example to 240°–260°F., to prevent premature decomposition of the blowing agent or premature curing (scorching) while these ingredients are being uniformly distributed in the blend.

The fabric base or backing employed in making the coated fabric of the invention may be any suitable conventional fabric, made from any desired natural or synthetic textile such as cotton, rayon, nylon, etc., and may be a woven, knitted, or non-woven fabric. Frequently the fabric backing has a weight or thickness such as to provide from about 0.5 or less to about 2 or more linear yards per pount (based on a standard 59 inch width). Before applying the coating blend of vinyl chloride resin and butadiene-acrylonitrile rubber it is usually desirable to treat the fabric with a suitable adhesive such as for example a plastisol, particularly a plastisol based on a vinyl chloride polymer, such as polyvinyl chloride or vinyl chloride-vinyl acetate copolymer. As is well known, such a plastisol is made up of particles of the resin suspended in a suitable liquid plasticizer to form a paste-like composition. After application to the fabric, the plastisol adhesive is fused by heating in the conventional manner. Other adhesives may be used, such as solvent-based nitrile or neoprene types, or latex-based vinyl, nitrile or neoprene types. Frequently the weight of adhesive applied amounts to from about 1 ounce or less to about 4 ounces or more, per square yard of fabric.

Prior to applying the expandable layer of vinyl chloride resin blended with butadiene-acrylonitrile resin to the fabric in accordance with the invention, it is preferred that a non-expandable layer of vinyl resin be applied, to serve as an intermediate layer or substrate, in between the fabric backing and the cellular blend surface layer. Thus, there may be applied to the adhesive-coated fabric backing, suitably by calendering, a base compound which contains from about 20 parts to 100 parts of the vinyl chloride resin and correspondingly from about 80 parts to 0 parts of the butadiene-acrylonitrile rubber by weight. As pointed out previously, vulcanizing ingredients for the butadiene-acrylonitrile rubber are included in the expandable surface composition blend which is to form the suede finish on the fabric. It is desirable that the non-expandable intermediate or substrate blend also contain curatives for the butadiene-acrylonitrile rubber component, if present. The intermediate non-expandable layer or substrate is usually applied by calendering and in many cases is applied in a thickness of from about 4 mils or less to about 8 mils or more.

Like the base or substrate layer, the expandable surface layer is suitably applied by calendering, at an elevated temperature below the decomposition temperature of the blowing agent. In many cases the thickness of the applied expandable layer is from about 5 mils or less to about 30 mils or more.

Thereafter, the composite coated fabric is heated to a temperature sufficiently elevated to decompose the blowing agent, causing expansion in the expandable layer. Cure of the rubber component of the layers ordinarily also takes place at this stage. It is preferred that the composite coated fabric be maintained under tension during expansion and cure to reduce wrinkling and transverse shrinkage. For example while being heated in an oven at a temperature sufficiently elevated to decompose the blowing agent and cure the rubber component the composite fabric is held in a tentering frame.

Following expansion and cure the coated fabric is cooled. The surface layer is then abraded (buffed) to remove the outer surface skin and expose the cells, thereby imparting a suede-like appearance and feel to the surface. The appearance in the final product can be varied by controlling the size of the cells generated in the expanded layer of the product in known manner. Coarser cells will result in a suede surface having a coarse appearance, while those suede surfaces developed from cellular layers having fine cells will be a finer suede.

It is a most remarkable advantage of the invention that the shine or glint that is so objectionable in conventional artificial suede is eliminated by employing, as the polymeric coating, the blend including a cured butadiene-acrylonitrile rubber component along with the vinyl chloride resin component, in accordance with the invention.

An important advantage of the invention resides in the high resistance of the product to abrasion. The abrasion resistance is especially enhanced when the described non-expanded intermediate layer is included in the composite.

The following examples, in which all quantities are expressed by weight, will serve to illustrate the practice of the invention in more detail.

EXAMPLE 1

A 1.02 (linear yards per pound, 59 inches wide) cotton sateen fabric is printed with a plastisol adhesive on one surface only, the adhesive consisting of 100 parts of vinyl chloride/vinyl acetate (85/15) copolymer resin ("Marvinol VR-56" (trademark)) and 100 parts of di(2-ethylhexyl) phthalate (DOP) plasticizer. The pick-up of adhesive is 2.5 ounces per square yard of fabric. The plastisol adhesive is fused by exposing the composite to a temperature of 320°F. for 3 minutes.

A curable non-expandable base compound is mixed according to the following formulation:

| | | |
|---|---|---|
| Medium high molecular weight calender grade polyvinyl chloride resin "Marvinol VR-23" (trademark)) | 67 | parts |
| Butadiene-acrylonitrile rubber (35% acrylonitrile; "Paracril J-4158 (trademark)) | 33 | " |
| Stabilizer-sodium silicate phosphate ("Vanstay L" (trademark)) | 1.5 | " |
| Dioctyl phthalate (DOP) plasticizer | 42.5 | " |
| Zinc oxide | 2.5 | " |
| Curative (tetraethylthiuram disulfide) | 3.5 | " |
| Accelerator (zinc 2-mercaptobenzothiazole) | 1.5 | " |

The foregoing base compound is calendered at a thickness of 8 mils onto the plastisol adhesive coated side of the sateen fabric, at a temperature between 260° and 275°F.

A curable expandable surface compound is mixed having the same formulation as the above base compound but additionally containing 10 parts of a blowing agent paste consisting of a 50/50 blend of azodicarbonamide and DOP. In a second calendering operation a 15 mil thickness of this curable expandable compound is applied on top of the base compound at a temperature between 260° and 275°F.

The composite coated fabric is then heated at 400°F. for 3½ minutes, a time and temperature sufficient to decompose the blowing agent, causing expansion in the expandable layer. This heating operation also causes cure of the butadiene-acrylonitrile elastomer component of the blend.

Following expansion and cure the coated fabric is allowed to cool to room temperature. The total thickness of the coated fabric is approximately 85 mils. The surface of the cellular layer is abraded (buffed) with a rotary or circular buffer having an abrading surface of 80 grit sandpaper. Following buffing the overall gauge of the sueded coated fabric is 50 mils. In a Taber abrasion test carried out with an H-22 (coarse) wheel at 1000 gm. load, 100 cycles, the weight loss is only 0.64%. The coated fabric performs well in the Masland cold crack test at −10°F., showing only small surface cracks. The sueded surface has a desirable dull finish and no gloss or glint is noticeable even when the coated fabric is flexed slightly so that the buffed surface has a convex bend.

EXAMPLES 2–4

Table I summarizes additional Examples 2–4, which use varying ratios of polyvinyl chloride and nitrile rubber. In Example 4 the non-expandable base or substrate composition contains no nitrile rubber or curatives. Table II gives the abrasion and flex results for Examples 2–4.

Table I

| | Coating Compositions | | | | | |
|---|---|---|---|---|---|---|
| | Ex. 2 Base | Exp. | Ex. 3 Base | Exp. | Ex. 4 Base | Exp. |
| Polyvinyl Chloride (Marvinol VR-23) | 75 | 75 | 25 | 25 | 100 | 75 |
| Butadiene Acrylonitrile Rubber (Paracril J-4158) | 25 | 25 | 75 | 75 | | 25 |
| Stabilizer - Sodium Silicate Phosphate Complex (Vanstay L) | 1.5 | 1.5 | 1.5 | 1.5 | 2.0 | 1.5 |
| Hydrated Alumina - Filler | 25 | 25 | 25 | 25 | 33.2 | 25 |
| Dioctyl Phthalate (DOP) | 50 | 50 | 50 | 50 | 70 | 50 |
| Zinc Oxide | 2.5 | 2.5 | 2.5 | 2.5 | | 2.5 |
| Plasticizer - Monomeric Epoxidized Tallate Oil (Monoplex S-73) | 7.5 | 7.5 | 7.5 | 7.5 | 10.0 | 7.5 |
| Blowing Agent - 50/50 blend of azodicarbonamide and DOP | | 9 | | 9 | | 9 |
| Curative - Ethyl Tuex (tetraethylthiuram disulfide) | 3.5 | 3.5 | 4.35 | 4.35 | | 3.5 |
| Accelerator - OXAF (Zinc salt of 2-mercaptobenzothiazole) | 1.5 | 1.5 | 2.25 | 2.25 | | 1.5 |

Table II

| | Abrasion and Flex Tests | | | |
|---|---|---|---|---|
| | Ex. 1 | Ex. 2 | Ex. 3 | Ex. 4 |
| Taber abrasion H-22 wheel 1000 gm load 100 cycles % wt. loss | .64 | 1.66 | 1.95 | 1.60 |
| Masland Cold Crack −10°F. | | Small Surface Cracks | Small Surface Cracks | Small Surface Cracks |
| Masland Cold Crack Lowest temp. to failure | | | −30°F.* | |

*The failure at lowest temperature is recognized by deep surface cracks appearing in the sample.

I claim:

1. A coated fabric having a suede-like surface, comprising a base fabric coated with an expanded surface coating which is a blend of vinyl chloride resin and butadiene-acrylonitrile rubber containing a sulfur or a sulfur-yielding vulcanizing agent for the butadiene-acrylonitrile rubber in amount sufficient to vulcanize the butadiene-acrylonitrile rubber, whereby the said butadiene-acrylonitrile rubber is cured, the surface of said coating being abraded to expose cells of the expanded blend, thereby providing a suede-like surface which is free from objectionable glint by reason of the presence of the cured butadiene-acrylonitrile rubber in the expanded blend.

2. A coated fabric as in claim 1 in which the vinyl chloride resin is vinyl chloride homopolymer or a copolymer of a major proportion of vinyl chloride with a minor proportion of a copolymerizable monomer.

3. A coated fabric as in claim 1 in which the said base fabric is a woven fabric.

4. A coated fabric as in claim 1 in which the said base fabric is a non-woven fabric.

5. A Coated fabric as in claim 1 in which the ratio of vinyl chloride resin to butadiene-acrylonitrile rubber is from 20:80 to 80:20, by weight.

6. A coated fabric as in claim 1 in which the said blend contains from 20 to 40 parts of the butadiene-acrylonitrile rubber and correspondingly from 80 to 60 parts of vinyl chloride resin, by weight.

7. A coated fabric as in claim 1 in which the said vinyl chloride resin is polyvinyl chloride.

8. A coated fabric as in claim 1 in which the said fabric is pretreated with an adhesive.

9. A coated fabric as in claim 8 in which the said adhesive is a plastisol.

10. A coated fabric as in claim 1 in which there is a non-expanded substrate underlying said blend coating, said non-expanded substrate being a composition comprising from 20 to 100 parts of vinyl chloride resin and correspondingly from 80 to 0 parts of butadiene-acrylonitrile rubber.

11. A coated fabric as in claim 10 in which the said non-expanded substrate contains cured butadiene-acrylonitrile rubber.

12. A coated fabric as in claim 1 in which the said base fabric is a knitted fabric.

13. A coated fabric as in claim 11, wherein there is further present in the blend an organic accelerator of sulfur vulcanization.

* * * * *